(12) United States Patent
He et al.

(10) Patent No.: US 12,511,913 B2
(45) Date of Patent: Dec. 30, 2025

(54) CAMERA MONITOR SYSTEM WITH CAMERA WING UNFOLDING STATUS DETECTION BASED UPON IMAGE PROCESSING

(71) Applicant: Stoneridge, Inc., Novi, MI (US)

(72) Inventors: Yu He, Dearborn Heights, MI (US); Utkarsh Sharma, Farmington Hills, MI (US); Liang Ma, Rochester, MI (US)

(73) Assignee: Stoneridge, Inc., Novi, MI (US)

( * ) Notice: Subject to any disclaimer, the term of this patent is extended or adjusted under 35 U.S.C. 154(b) by 0 days.

(21) Appl. No.: 18/911,970

(22) Filed: Oct. 10, 2024

(65) Prior Publication Data

US 2025/0121773 A1 Apr. 17, 2025

Related U.S. Application Data

(60) Provisional application No. 63/544,319, filed on Oct. 16, 2023.

(51) Int. Cl.
*G06T 7/80* (2017.01)
*B60R 1/25* (2022.01)
(Continued)

(52) U.S. Cl.
CPC ............... *G06V 20/58* (2022.01); *B60R 1/25* (2022.01); *G06T 7/80* (2017.01); *G06V 10/44* (2022.01);
(Continued)

(58) Field of Classification Search
CPC .... G06V 20/58; G06V 10/7715; G06V 10/44; G06T 7/80; G06T 2207/30252;
(Continued)

(56) References Cited

U.S. PATENT DOCUMENTS 8,643,724 B2  2/2014  Schofield et al.
9,834,216 B2  12/2017  Pawlicki et al.
(Continued)

FOREIGN PATENT DOCUMENTS

WO     2021043393 A1    3/2021
WO   WO-2023133431   *   1/2023
WO     2023121908 A1    6/2023

OTHER PUBLICATIONS

1 International Search Report for International Application No. PCT/US2024/050747 dated Jan. 14, 2025.

*Primary Examiner* — Zaihan Jiang
(74) *Attorney, Agent, or Firm* — Carlson, Gaskey & Olds, P.C.

(57) ABSTRACT

A method of checking wing position in a CMS includes performing a calibration of a wing position supporting a camera relative to a vehicle to provide a desired field of view by capturing multiple images at different lighting conditions, extracting and storing a reference feature from each of the multiple images, triggering a wing position check, capturing a current image from the camera having a current position of the reference feature; sensing a current lighting condition at which the current image is captured, determining that one of the different lighting conditions is more similar to the current lighting condition, comparing the current position of the reference feature to the stored reference feature from the one of the multiple images generated under the one of the different lighting conditions, and outputting a result of the wing position check if a difference from the comparing step exceeds a threshold value.

18 Claims, 9 Drawing Sheets

(51) Int. Cl.
*G06V 10/44* (2022.01)
*G06V 10/77* (2022.01)
*G06V 20/58* (2022.01)
*H04N 23/695* (2023.01)

(52) U.S. Cl.
CPC ....... *G06V 10/7715* (2022.01); *H04N 23/695* (2023.01); *B60R 2300/30* (2013.01); *B60R 2300/80* (2013.01); *G06T 2207/30252* (2013.01)

(58) Field of Classification Search
CPC ... B60R 1/25; B60R 2300/30; B60R 2300/80; H04N 23/695
See application file for complete search history.

(56) References Cited

U.S. PATENT DOCUMENTS

| | | | | |
|---|---|---|---|---|
| 9,975,499 | B2* | 5/2018 | Popham | B60R 11/04 |
| 2006/0204121 | A1* | 9/2006 | Bryll | G06T 7/0004 |
| | | | | 396/89 |
| 2008/0151079 | A1* | 6/2008 | Iijima | H04N 23/673 |
| | | | | 348/241 |
| 2015/0109414 | A1* | 4/2015 | Adam | H04N 13/296 |
| | | | | 348/46 |
| 2016/0086033 | A1 | 3/2016 | Molin et al. | |
| 2016/0142596 | A1 | 5/2016 | DePaschoal | |
| 2016/0347237 | A1* | 12/2016 | Bhakta | F21S 41/255 |
| 2018/0048894 | A1* | 2/2018 | Chen | G06T 7/11 |
| 2018/0090039 | A1 | 3/2018 | Singireddy | |
| 2018/0359416 | A1* | 12/2018 | Hold-Geoffroy | G06V 10/82 |
| 2019/0152392 | A1 | 5/2019 | Depaschoal et al. | |
| 2020/0193643 | A1* | 6/2020 | Hess | G06V 10/44 |
| 2020/0294401 | A1 | 9/2020 | Kerecsen | |
| 2021/0158561 | A1 | 5/2021 | Park et al. | |
| 2021/0178984 | A1 | 6/2021 | Goth et al. | |
| 2021/0380143 | A1 | 12/2021 | Alvarez et al. | |
| 2022/0353401 | A1* | 11/2022 | Do | H04N 23/687 |
| 2023/0143446 | A1* | 5/2023 | Schönlieb-Stalzer | |
| | | | | G06V 10/147 |
| | | | | 345/426 |
| 2023/0162509 | A1* | 5/2023 | DeLizo | G01B 17/00 |
| | | | | 382/103 |
| 2023/0206497 | A1 | 6/2023 | Sharma et al. | |
| 2023/0219488 | A1* | 7/2023 | Hsu | B60Q 1/12 |

* cited by examiner

CAMERA MONITOR SYSTEM WITH CAMERA WING UNFOLDING STATUS DETECTION BASED UPON IMAGE PROCESSING

CROSS-REFERENCED TO RELATED APPLICATION

This application claims priority to U.S. Provisional Application No. 63/544,319, filed Oct. 16, 2023.

TECHNICAL FIELD

This disclosure relates to a camera monitor system (CMS) for use in a commercial truck or similar vehicle, and, in particular, to a CMS capable of checking a wing position using image processing.

BACKGROUND

Mirror replacement systems, and camera systems for supplementing mirror views, are utilized in commercial vehicles to enhance the ability of a vehicle operator to see a surrounding environment. Camera monitor systems (CMS) utilize one or more cameras to provide an enhanced field of view to a vehicle operator. In some examples, the CMS covers a larger field of view than a conventional mirror, or includes views that are not fully obtainable via a conventional mirror.

In a typical CMS, there is a camera arm, or camera wing, arranged on each of the left- and right-hand sides of the tractor to provide Class II and Class IV views. A display is provided on each A-pillar on driver and passenger sides to display the field of view for the camera arm on that side, simulating a conventional mirror.

In some applications, the camera wing may be configured to fold, either manually or in response to actuation of a motor. For some customers, it may be desirable to automatically determine without driver input whether the camera is unfolded and in a position that will continue provide the desired view. Thus, it may be desirable to provide some CMS with camera wing position verification. One example prior art system includes a physical sensor packaged within the camera wing, but such a design requires additional components and wiring, adding cost to the CMS.

BRIEF DESCRIPTION OF THE DRAWINGS

The disclosure can be further understood by reference to the following detailed description when considered in connection with the accompanying drawings wherein.

Figure 1A:
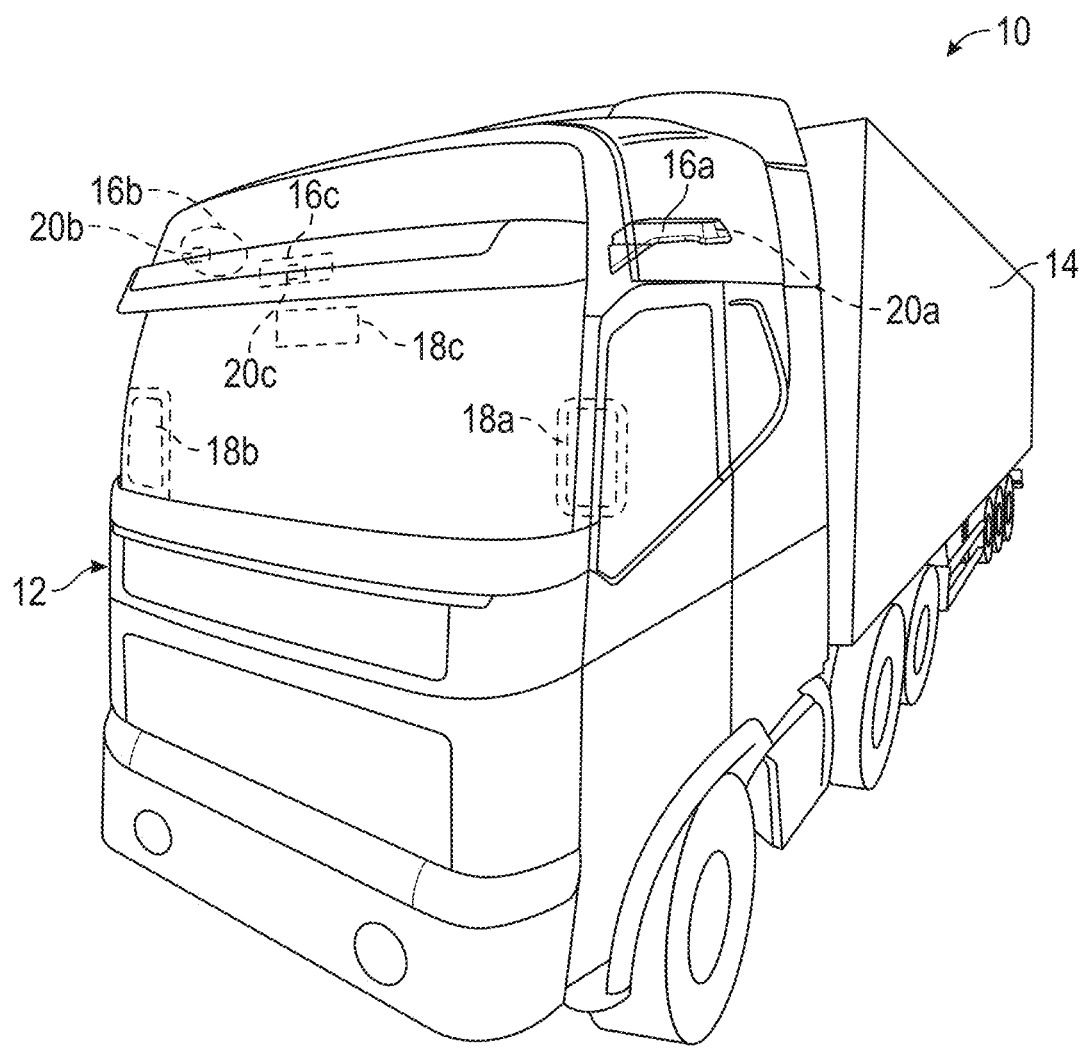
FIG. 1A is a schematic front view of a commercial truck with a camera monitor system (CMS) used to provide at least Class II, Class IV, Class V and Class VI views.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible. Like reference numbers and designations in the various drawings indicate like elements.

SUMMARY

In some examples, a method of checking wing position in a camera monitor system, includes performing a calibration of a wing position supporting a camera relative to a vehicle to provide a desired field of view by capturing multiple images with at different lighting conditions; extracting and storing a reference feature from each of the multiple images; triggering a wing position check; capturing a current image from the camera, the current image having a current position of the reference feature; sensing a current lighting condition at which the current image is captured; determining that one of the different lighting conditions is more similar to the current lighting condition; comparing the current position of the reference feature to the stored reference feature from the one of the multiple images generated under the one of the different lighting conditions; and outputting a result of the wing position check if a difference from the comparing step exceeds a threshold value.

In further examples of any of the foregoing examples, the performing a calibration includes: performing a first calibration, including calibrating a wing position supporting a camera relative to a vehicle to provide a desired field of view, and the calibrating includes generating a first calibrated image from the camera under a first lighting condition, and performing a second calibration, including generating a second calibrated image from the camera under a second lighting condition different from the first lighting condition.

In further examples of any of the foregoing examples, the extracting a storing a reference feature includes: extracting and storing a reference feature from the first calibrated image; and extracting and storing the reference feature from the second calibrated image.

In further examples of any of the foregoing examples, the determining step includes: determining that one of the first lighting condition and the second lighting condition is more similar to the current lighting condition.

In further examples of any of the foregoing examples, the comparing step includes: comparing the current position of the reference feature to the stored reference feature from the one of the first calibrated image and the second calibrated image generated under the one of the first lighting condition and the second lighting condition.

In further examples of any of the foregoing examples, the calibration is performed upon installation of the wing onto the vehicle.

In further examples of any of the foregoing examples, the calibration is performed with the wing in an unfolded position and the camera trained upon a legally prescribed field of view.

In further examples of any of the foregoing examples, the reference feature includes a vertical edge of a tractor of the vehicle.

In further examples of any of the foregoing examples, the method includes storing the captured image as a third calibrated image check if a difference from the comparing step exceeds a second threshold value.

In further examples of any of the foregoing examples, the triggering step is performed based upon a time interval.

In further examples of any of the foregoing examples, the comparing step includes comparing a distance between at least a portion of the stored reference feature of the one of the multiple images generated under the one of the different lighting conditions from the current position of the reference feature in 2D space.

In further examples of any of the foregoing examples, the distance is a distance between pixels in captured images of from the one of the multiple images and the current image.

In further examples of any of the foregoing examples, the result is at least one of a visible warning and an audible warning.

In some examples, a camera monitor system (CMS) for a vehicle includes a wing pivotably mounted to the vehicle. A camera is mounted to the wing and includes an image capture unit configured to provide a desired field of view of the vehicle. A display depicts at least a portion of the field of view. An input is configured to trigger a wing position check. A controller is in communication with the camera and the display, and the controller includes a calibration module in which a reference feature is extracted from each of multiple images captured under different lighting conditions in which the desired field of view is provided. The controller includes a memory in which the reference feature is stored, and a wing position verification module responsive to the input. The wing position verification module is configured to capture a current image from the camera having a current position of the reference feature under a current lighting condition. One or more sensors are in communication with the controller and configured to sense the different lighting conditions and the current lighting condition. The wing position verification module is configured to determine that one of the different lighting conditions is more similar to the current lighting condition, compare the current position reference feature to the stored reference feature from the one of the multiple images associated with the one of the different lighting conditions, and output a result of the wing position check if a difference from comparing step exceeds a threshold value.

In further examples of any of the foregoing examples, the reference feature is extracted from a first calibrated image of the camera under a first lighting condition in which the desired field of view is provided, and the reference feature is extracted from a second calibrated image of the camera in which the desired field of view is provided under a second lighting condition different from the first lighting condition.

In further examples of any of the foregoing examples, the one or more sensors are configured to sense the first lighting condition, the second lighting condition, and the current lighting condition.

In further examples of any of the foregoing examples, the wing position verification module is configured to determine that one of the first lighting condition and the second lighting condition is more similar to the current lighting condition.

In further examples of any of the foregoing examples, the output is a visible warning on the display.

In further examples of any of the foregoing examples, the desired view corresponds to a legally prescribed view providing at least one of Class II and Class IV views.

In further examples of any of the foregoing examples, the reference feature includes a vertical edge of a tractor of the vehicle.

In further examples of any of the foregoing examples, the input is at least one of a gear position sensor configured to provide a gear position and an engine sensor configured to provide an engine operating state.

In further examples of any of the foregoing examples, the input is a time interval.

In further examples of any of the foregoing examples, the comparing step includes comparing a distance between at least a portion of the stored reference feature of the one of the multiple images associated with the one of the different lighting conditions from the current position of the reference feature in 2D space, and the distance is a distance between pixels in captured images of the one of the multiple images and the current image.

In further examples of any of the foregoing examples, the wing includes a fixed portion configured to be secured to the vehicle, and a foldable portion pivotably mounted on the fixed portion, and the camera is mounted to the foldable portion.

In further examples of any of the foregoing examples, the wing includes a motor in communication with the controller, the motor configured to fold and unfold the foldable portion relative to the fixed portion in response to a command from the controller, and the controller is configured to send the command to the motor in response to the difference being above the threshold value in order to actuate the foldable portion and provide the desired field of view.

DETAILED DESCRIPTION

Figure 1B:
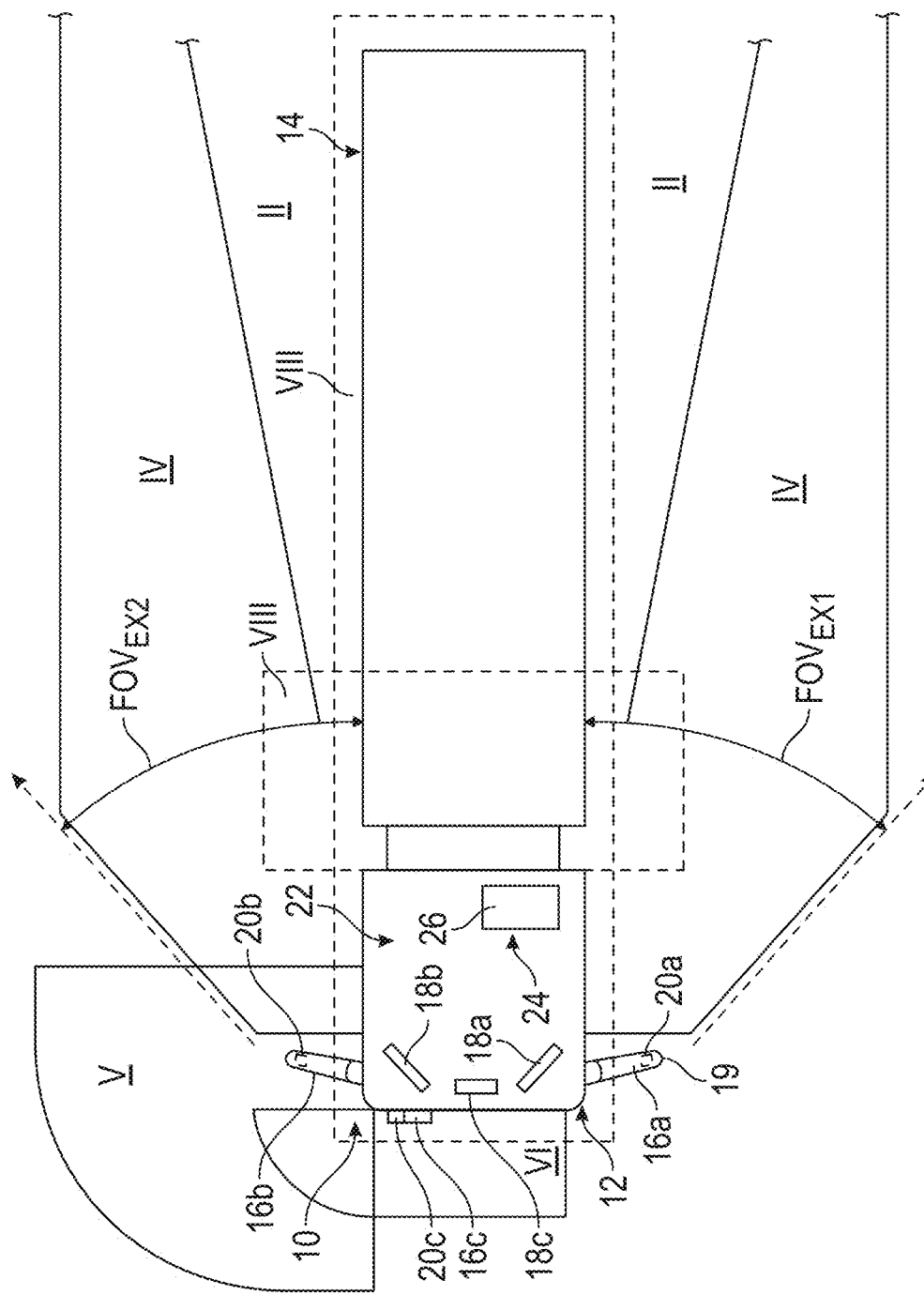
FIG. 1B is a schematic top view of a commercial truck with a CMS providing at least Class II, Class IV, Class V and Class VI views.

A schematic view of a commercial vehicle 10 is illustrated in FIGS. 1A and 1B. The vehicle 10 includes a vehicle cab or tractor 12 for pulling a trailer 14. It should be understood that the vehicle cab 12 and/or trailer 14 may be any configuration. Although a commercial truck is contemplated in this disclosure, the invention may also be applied to other types of vehicles. The vehicle 10 incorporates a camera monitor system (CMS) 15 (FIG. 2) that has driver and passenger side camera arms (i.e., camera wings) 16a, 16b (generally, camera arm 16, or camera wing 16) mounted to the outside of the vehicle cab 12. If desired, the camera arms 16a, 16b may include conventional mirrors integrated with them as well, although the CMS 15 can be used in some examples to entirely replace mirrors. In additional examples, each side can include multiple camera arms, each arm housing one or more cameras and/or mirrors.

Each of the camera arms 16a, 16b includes a base that is secured to, for example, the cab 12. A pivoting arm is supported by the base and may articulate relative thereto. At least one rearward facing camera 20a, 20b (generally, camera 20) is arranged respectively within camera arms 16a, 16b. The exterior cameras 20a, 20b respectively provide an exterior field of view $FOV_{EX1}$, $FOV_{EX2}$ that each include at least one of the Class II and Class IV views (FIG. 1B), which are legal prescribed views in the commercial trucking industry. The Class II view on a given side of the vehicle 10 is a subset of the class IV view of the same side of the vehicle 10. Multiple cameras also may be used in each camera arm 16a, 16b to provide these views, if desired. Class II (narrow)

and Class IV (wide angle) views are defined in European R46 legislation, for example, and the United States and other countries have similar drive visibility requirements for commercial trucks. Any reference to a "Class" view is not intended to be limiting, but is intended as exemplary for the type of view provided to a display by a particular camera. Each arm 16*a*, 16*b* may also provide a housing that encloses electronics, e.g., a controller, that are configured to provide various features of the CMS 15.

First and second video displays 18*a*, 18*b* (generally, display 18) are arranged on each of the driver and passenger sides within the vehicle cab 12 on or near the A-pillars 21*a*, 21*b* (generally, A-pillar 21) to display Class II and Class IV views on its respective side of the vehicle 10, which provide rear facing side views along the vehicle 10 that are captured by the exterior cameras 20*a*, 20*b*.

If video of Class V and/or Class VI views are also desired, a camera housing 16*c* and camera 20*c* may be arranged at or near the front of the vehicle 10 to provide those views (FIG. 1B). A third display 18*c* arranged within the cab 12 near the top center of the windshield can be used to display the Class V and Class VI views, which are toward the front of the vehicle 10, to the driver. The displays 18*a*, 18*b*, 18*c* (generally, display 18) face a driver region 24 within the cabin 22 where an operator is seated on a driver seat 26. The location, size and field(s) of view streamed to any particular display may vary from the configurations described in this disclosure and still incorporate the disclosed invention.

If video of Class VIII views is desired, camera housings can be disposed at the sides and rear of the vehicle 10 to provide fields of view including some or all of the Class VIII zones of the vehicle 10. In such examples, the third display 18*c* can include one or more frames displaying the Class VIII views. Alternatively, additional displays can be added near the first, second and third displays 18*a*, 18*b*, 18*c* and provide a display dedicated to providing a Class VIII view.

It should be noted that a controller 30 (FIG. 2) for the CMS 15 can be used to implement the various functionalities disclosed in this application. The controller 30 may include one or more discrete units. For example, a centralized architecture may have a common controller arranged in the vehicle 10, while a decentralized architecture may use a controller provided in each of the displays 18*a*, 18*b*, for example. Moreover, a portion of the controller 30 may be provided in the vehicle 10, while another portion of the controller 30 may be located elsewhere, for example, the camera arms 16. In another example, a master-slave display configuration may be used where one display includes the controller 30 while the other display receives the commands from the controller 30.

In terms of hardware architecture, such a controller can include a processor, memory (e.g., memory 42, FIG. 2), and one or more input and/or output (I/O) device interface(s) that are communicatively coupled via a local interface. The local interface can include, for example but not limited to, one or more buses and/or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

Figure 2:
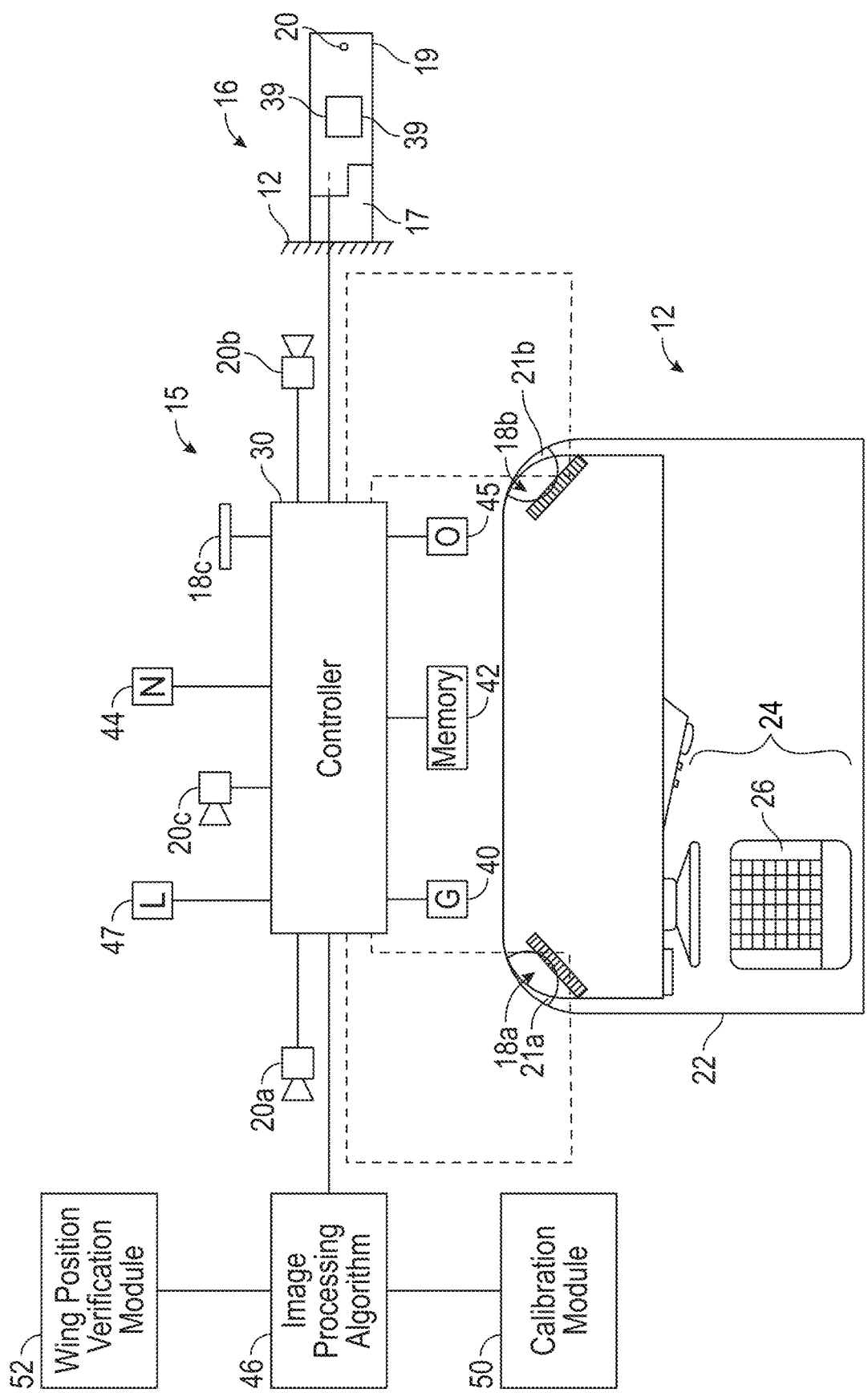
FIG. 2 is a schematic interior view of a vehicle cabin including displays and other schematic CMS features.

The controller 30 may be a hardware device for executing software, particularly software stored in memory (e.g., memory 42, FIG. 2). The controller 30 can be a custom made or commercially available processor, a central processing unit (CPU), an auxiliary processor among several processors associated with the controller, a semiconductor-based microprocessor (in the form of a microchip or chip set) or generally any device for executing software instructions.

The memory can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory may incorporate electronic, magnetic, optical, and/or other types of storage media. The memory can also have a distributed architecture, where various components are situated remotely from one another, but can be accessed by the processor.

The software in the memory may include one or more separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

The disclosed input and output devices that may be coupled to system I/O interface(s) may include input devices, for example but not limited to, a keyboard, mouse, scanner, microphone, camera, mobile device, proximity device, etc. Further, the output devices, for example but not limited to, a printer, display, etc. Finally, the input and output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

When the controller 30 is in operation, the processor can be configured to execute software stored within the memory, to communicate data to and from the memory, and to generally control operations of the computing device pursuant to the software. Software in memory, in whole or in part, is read by the processor, perhaps buffered within the processor, and then executed.

In one example, shown schematically in FIGS. 1B and 2, the camera arm 16 includes a fixed portion 17 secured to the vehicle 10, e.g., the side of the tractor 12. A foldable portion 19 is pivotally mounted to the fixed portion 17. In one example, a motor 39 is provided in the camera arm 16 to move the foldable portion 19 between folded/stowed position and an unfolded/operating position in response to a command, for example, from the controller 30. In the unfolded operating position, the camera 20 is arranged in a desired view, which may provide one or more legally prescribed views to its display 18.

With reference to FIG. 2, the controller 30 may be in communication with a variety of vehicle components via a CAN bus, LIN bus or other suitable communications architecture. For example, a gear position sensor 40 communicates with the controller 30 and is configured to provide the vehicle gear position, such as park, reverse, neutral, and a forward gear. An engine sensor 44, such as an engine speed sensor, is also in communication with the controller 30 to provide an engine operational state, such as engine idling. Other sensors 45 may be in communication with the controller 30 to provide one or more operational states to the CMS 15 for use with the wing position verification method described below. In some implementations, a lighting sensor 47 may be in communication with the controller 30 and may be configured to sense a lighting condition associated with the vehicle, such as the ambient lighting condition when an image is captured by a camera 20 disclosed herein.

Unlike prior art wing position verification schemes, the disclosed CMS 15 does not use additional, dedicated sensors to determine the wing position. Instead, the CMS 15 uses the same camera 20 and image capture unit that provides the legally prescribed views to the display 18 for the wing position verification feature. An image processing algorithm 46 is in communication with the controller 30 (e.g., residing in memory 42 as software) to extract the features from images captured by the image capture unit of the camera 20. The image processing algorithm 46 uses known image processing techniques to extract features from the captured images for a variety of CMS functionalities. For example, the image processing algorithm 46 may extract lines, shapes, colors, patterns and other attributes from the captured image. These extracted attributes can be used to detect objects such as tractor wheels, lane markers, trailer edges and other features. Example wheel detection algorithm techniques are disclosed in U.S. application Ser. No. 18/080,031 entitled "CAMERA MONITOR SYSTEM FOR COMMERCIAL VEHICLES INCLUDING WHEEL POSITION ESTIMATION", filed on Dec. 13, 2022 and U.S. Provisional Application Ser. No. 63/405,912 entitled "CAMERA MONITOR SYSTEM FOR COMMERCIAL VEHICLES INCLUDING WHEEL POSITION ESTIMATION", filed on Sep. 13, 2022, both of which are incorporated herein by reference in its entirety. Example trailer edge detection algorithm techniques are disclosed in U.S. application Ser. No. 17/952,459 entitled "TRAILER END TRACKING IN CAMERA MONITORING SYSTEM", filed Sep. 26, 2022 and U.S. Provisional Application Ser. No. 63/405,152 entitled "CAMERA MONITORING SYSTEM INCLUDING TRAILER PRESENCE DETECTION USING OPTICAL FLOW", filed on Sep. 9, 2022, which are incorporated herein by reference in its entirety. Example awareness indicator algorithm techniques are disclosed in Unites States application Ser. No. 18/134,261 entitled "CAMERA MIRROR SYSTEM INCLUDING AUTOMATIC ANGULAR ADJUSTMENT FOR COMMERCIAL VEHICLE DISPLAYS", filed on Apr. 13, 2023 and U.S. application Ser. No. 18/124,646 entitled "DYNAMIC LONGITUDINAL AND LATERAL ADJUSTMENT OF AWARENESS LINES FOR COMMERCIAL VEHICLE CAMERA MIRROR SYSTEM", filed on Mar. 22, 2023, which are incorporated herein by reference in its entirety.

Figure 3B:
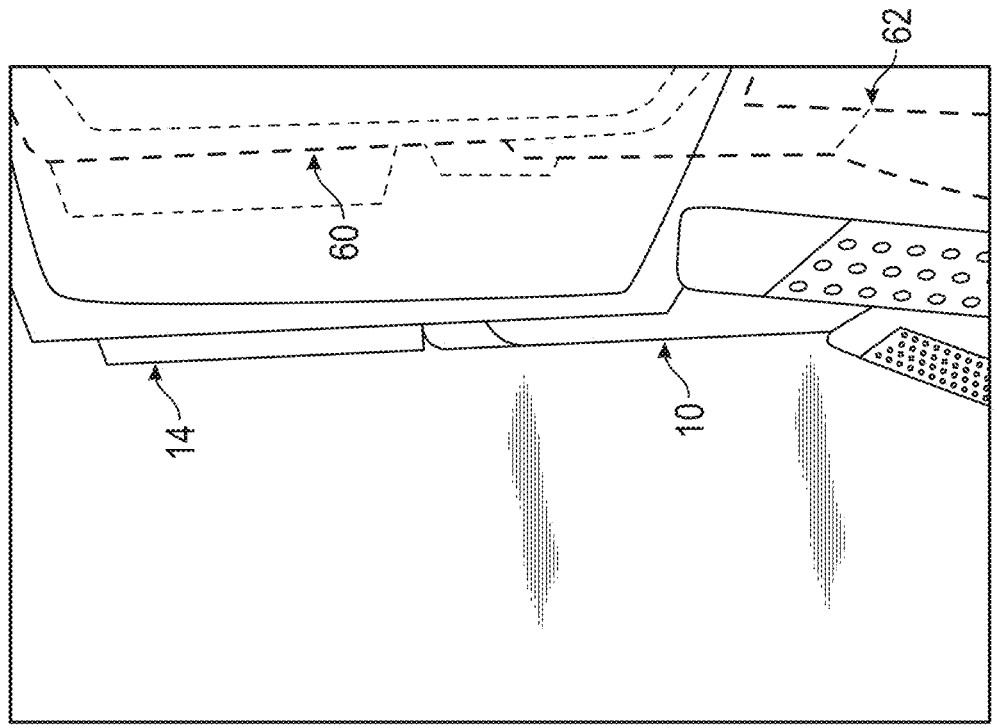
FIGS. 3A and 3B respectively correspond to a calibrated image and a current image, which does not correspond to the calibrated image.
Figure 3A:
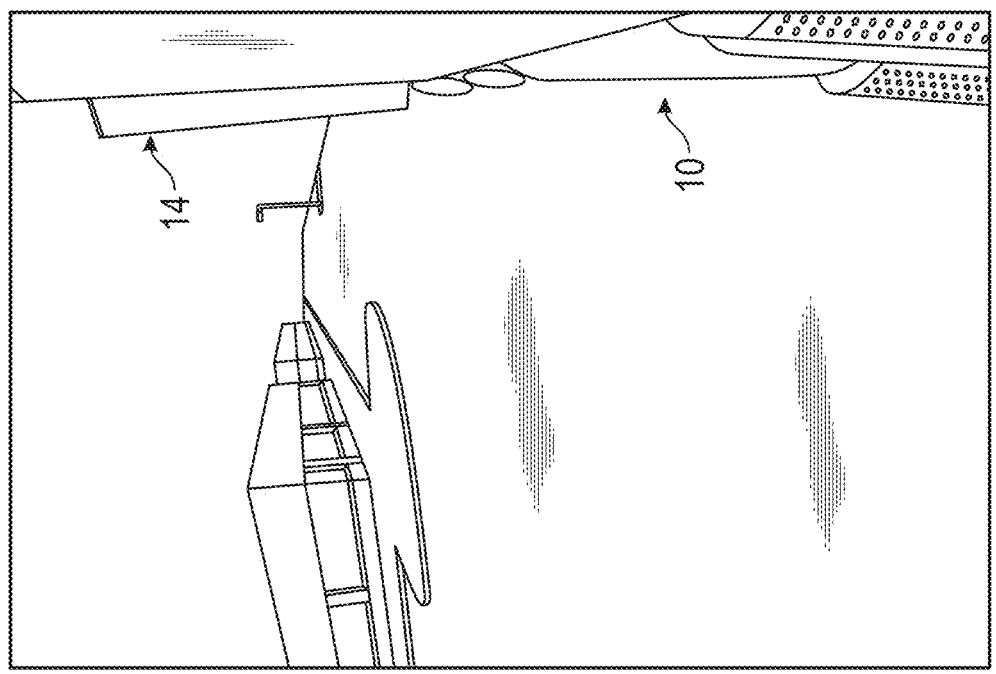

The CMS 15 includes a calibration module 50 that is used after the cameras 20 have been calibrated upon installation of the CMS 15 and the camera arms 16 into the vehicle. The calibration module 50 is a routine (e.g., software residing on memory 42) that is performed by the controller 30 once the legally prescribed views have been established. As shown in the wing position verification method 100 in FIG. 4, the calibration module is used to calibrate a wing position and its supported camera relative to the vehicle in order to provide the desired field of view (block 102). The calibration module extracts a reference feature from a calibrated image from the image capture unit of the camera 20 (block 104). An example calibrated image is shown in FIG. 3A. The reference feature may be a body contour line, component (62 in FIG. 3B), vertical edge (60 in FIG. 3B) or marking on the vehicle. In the case of the camera arm 16 being mounted to the tractor 12, it is desirable to extract the reference feature from the tractor 12, as a trailer 14 the trailer 14 move during use and may not be attached to the tractor upon installation of the calibration of the CMS 15 onto the tractor 12, or when a wing position verification is desired.

The CMS 15 also includes a wing position verification module 52 and which also uses the image processing algorithm 46. The wing verification module 52 is a routine (e.g., software residing on memory 42) that is performed by the controller 30. As shown in the method 100 in FIG. 4, the wing position verification module 52 is utilized in response to an event in which a wing position check is desired (block 106). The wing position check may be triggered based upon the operational state of the vehicle. For example, when the engine is started and/or when the vehicle is shifted out of park and into a gear (reverse or a forward gear), it may be desirable to initiate a wing position check. Alternatively or additionally, a wing position check may occur at a predetermined time interval during vehicle operation, such as every few seconds.

Once a wing position verification has been triggered, a current image (FIG. 3B) is captured by the camera 20, and image processing algorithm 46 attempts to extracts the current position of the same feature(s) previously captured and stored during calibration (block 108). The current position of the reference feature is compared to the stored reference feature to see if the camera 20 has been undesirably moved from its initially calibrated position (block 110), which may result in the camera being unable to provide the legally described view. This comparison may be performed by comparing a distance between at least a portion of the stored reference feature from the current position of the reference feature in 2-dimensional space. The distance may correspond to the distance between pixels in the captured images from the image capture unit of the calibrated image and the current image.

It may be desirable to provide some minimal discrepancy between the current position of the reference feature compared to the stored reference feature to prevent any false alerts relating to the wing position being out of its desired position. For example, one example calibrated camera provides a field of view of 70 degrees, whereas a legally prescribed field of view may only be 50 degrees. Thus, there may be some tolerance with respect to the camera wing being out of position and the legally described view still being provided. Accordingly, the output result is based upon a comparison relative to a threshold value (block 112; e.g., reference feature and current position of same feature being within a predetermined number of pixels). The output may be a visible warning on the display 18, for example, or an audible warning.

Figure 5A:
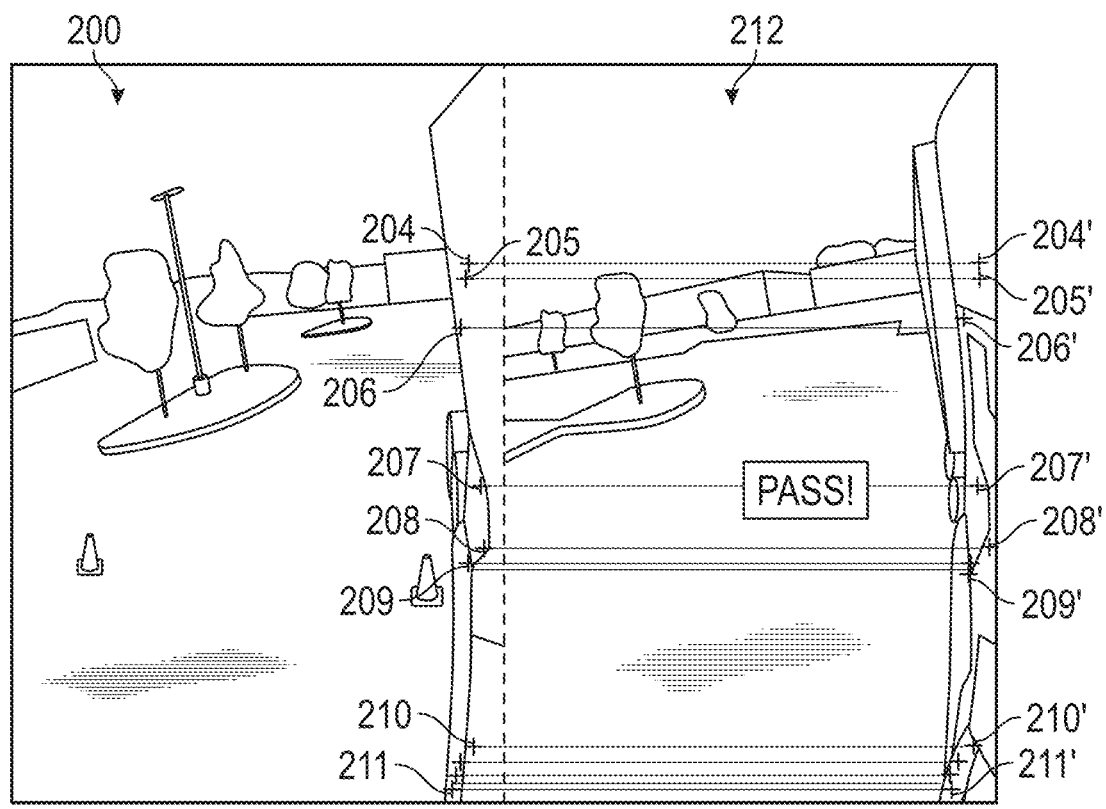
FIG. 5A illustrates an "acceptable" result following an example wing position verification.
Figure 5B:
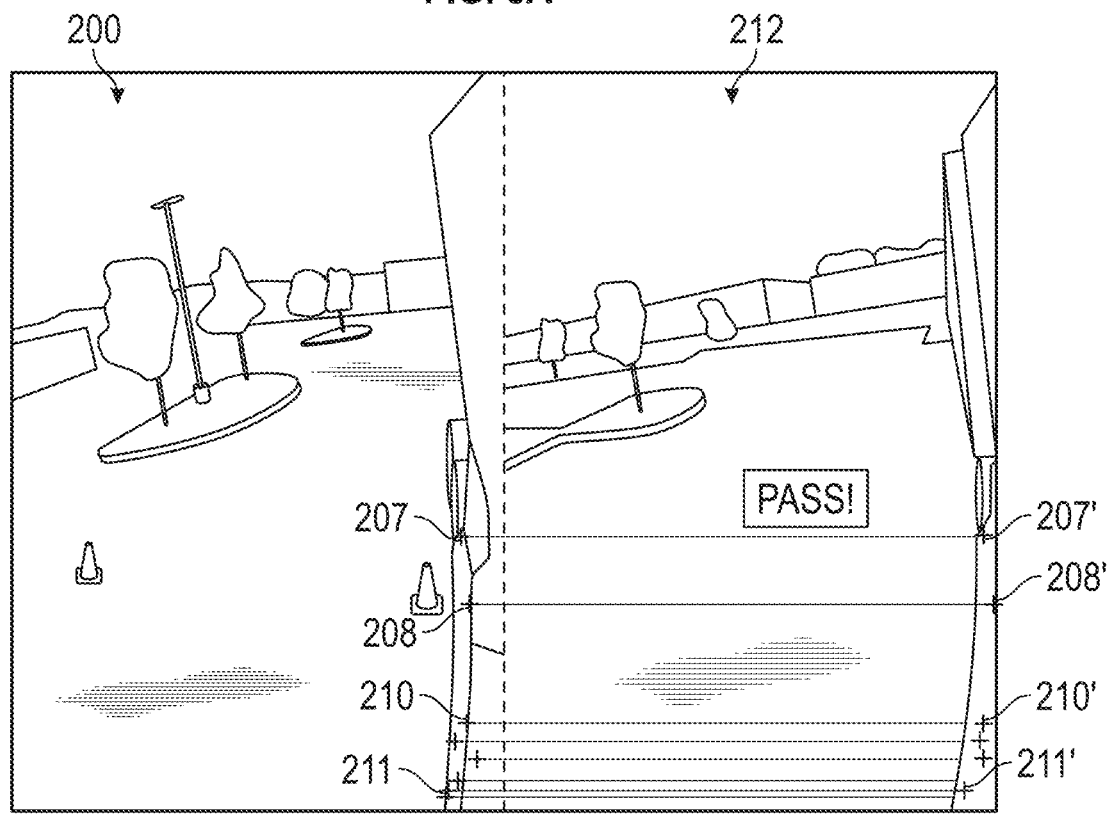
FIG. 5B illustrates another "acceptable" result following an example wing position verification.
Figure 5C:
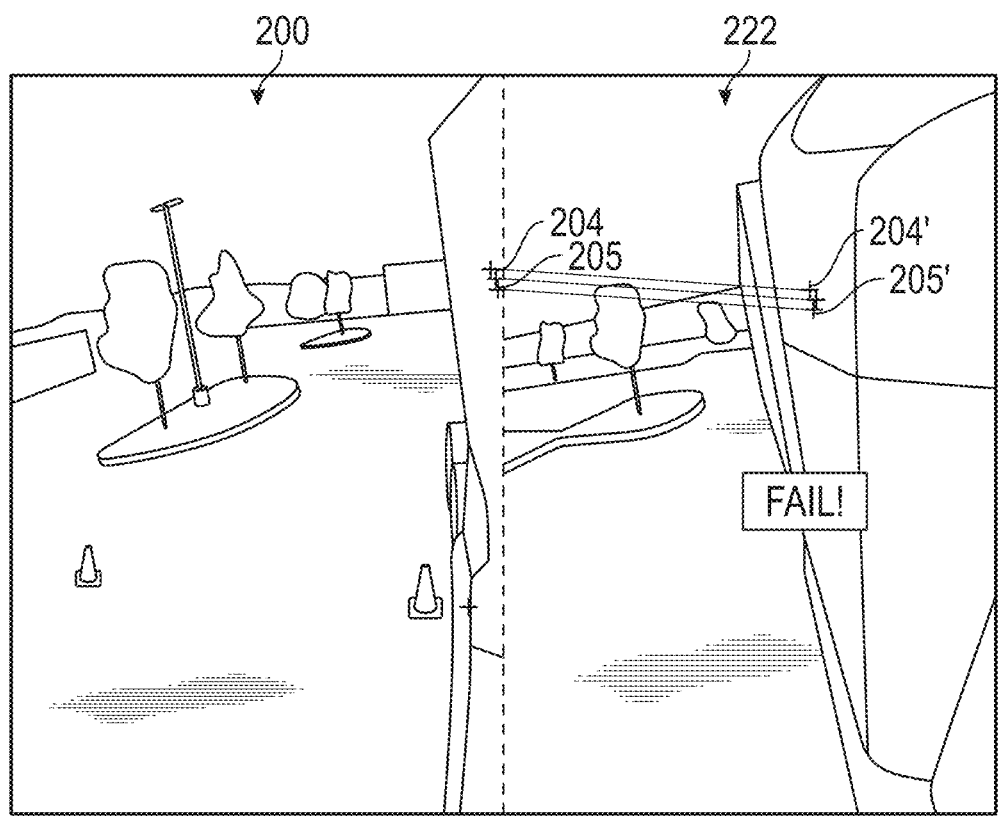
FIG. 5C illustrates an "unacceptable" result following an example wing position verification.

Examples of the wing folding verification are shown in FIGS. 5A-5C. View 200 illustrates the original calibrated wing position in which the legally prescribed views are provided. View 202 in FIG. 5A represents a wing verification in which the camera arm is determined to be deployed in the originally calibrated position, like view 200. View 212 in FIG. 5B represents a wing verification in which the camera arm is slightly out of position relative to the originally calibrated position, but still is able to provide the legally prescribed views. View 222 in FIG. 5C represents a wing verification in which the camera arm is out of position in which it can no longer provide the legally prescribed views. The views 200, 202, 212, 222 are depicted on the Class II (narrow FOV) portion of the passenger display 18, in the illustrated examples.

The points 204-211, 204'-211' and lines are shown for illustrative purposes only and would not be shown on the display 18. Points 204-211 correspond to various reference features from a calibrated image from the camera. Points 204'-211' correspond to current positions of the like numbered reference features in connection with the wing position verification process. The lines indicate horizontal matching of the reference feature in the calibrated position and its current position for illustrative purposes only.

The points 204'-211' shown in the views 202, 212, 214 are those having a sufficiently close pixel distance, for example, to the original reference feature (e.g., within 10 pixels of the original reference feature). If the current position of a sufficient predetermined number of the reference features is maintained, then the wing position can be assumed to be able to provide the legally prescribed views (e.g., FIG. 5B). But, if this threshold number of reference features is not maintained, then the camera arm is too far out of position (e.g., FIG. 5C), which is indicative of a camera arm issue that should be addressed.

If the wing position is determined to be out of its desired position and the camera arm 16 is powered with a motor 39, the CMS 15 may actuate the foldable portion 19 to the folded/stowed position and then attempt to redeploy the foldable portion 19 to its unfolded/operating position to restore the desired field of view. At this point, the wing position verification module 52 may again check the new current position relative to the stored reference feature. This procedure may capture multiple images during the folding operation, and those images may be analyzed in real time to identify the camera arm position in which a sufficient number of the current feature positions match the original feature positions in the stored capture image. The motor 39 can then be deenergized, maintaining the camera arm at a position that provides the legally prescribed views.

Figure 4:
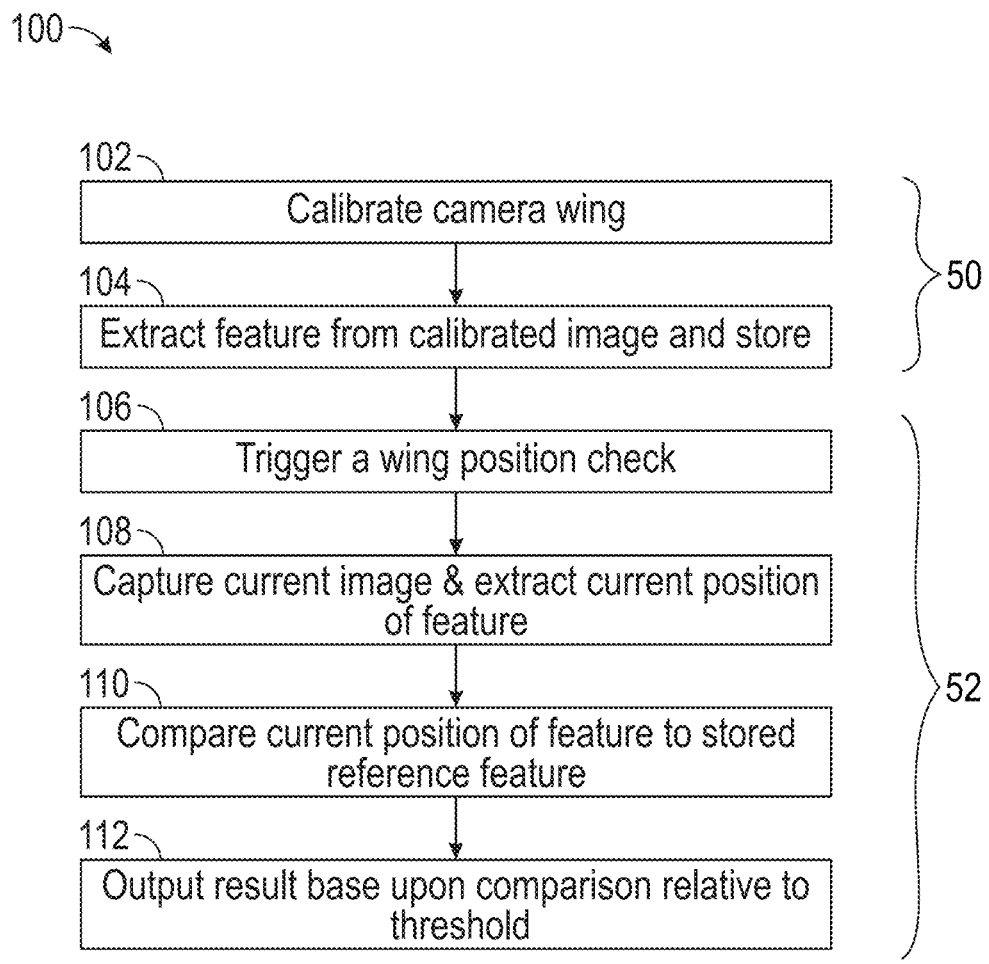
FIG. 4 is a method of wing position verification for the CMS.
Figure 6:
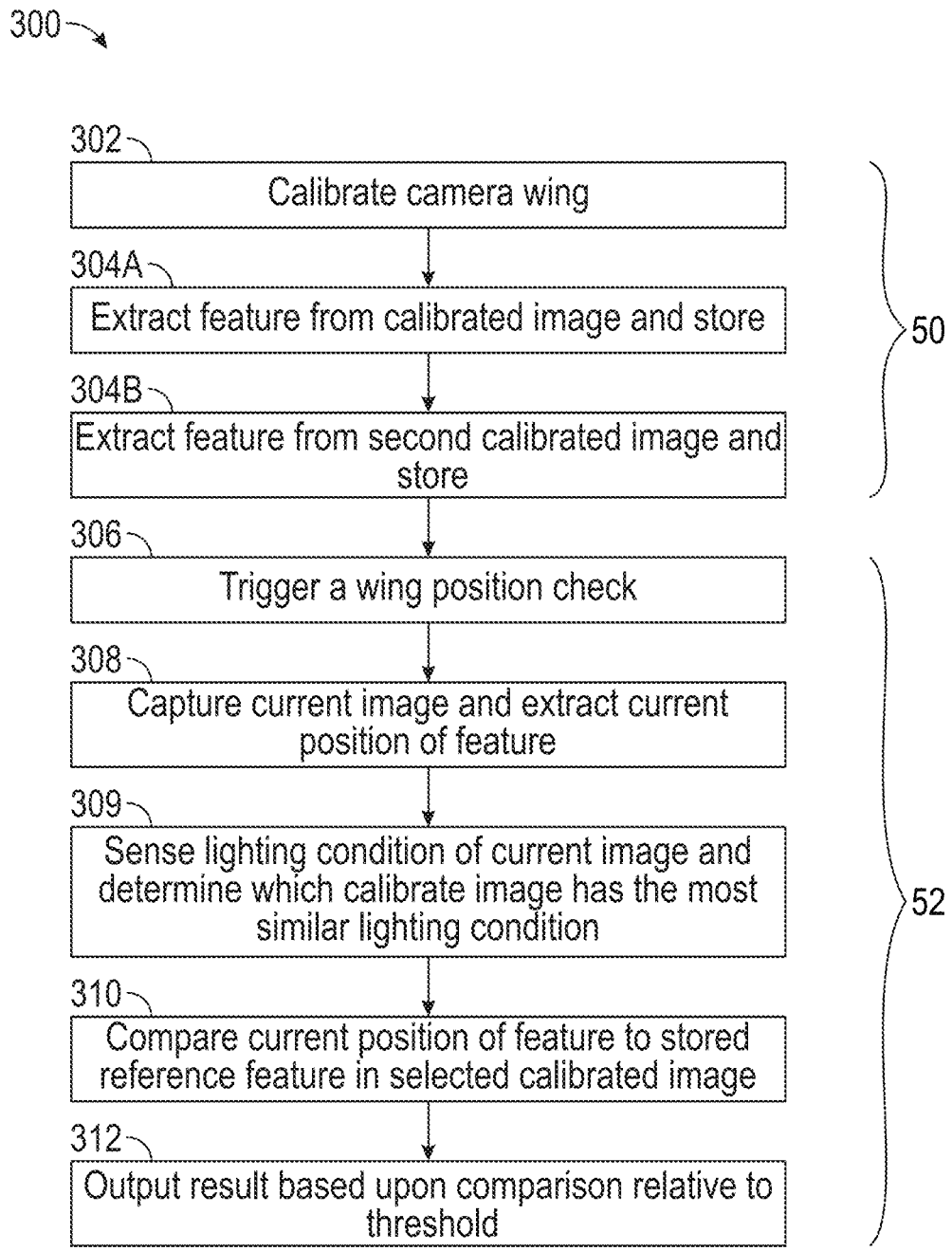
FIG. 6 illustrates another method of wing position verification for the CMS.

FIG. 6 illustrates a flow chart of another example method 300 substantially similar to the method 100 shown in FIG. 4. Fewer or additional steps than are recited below could be performed within the scope of this disclosure, and the recited order of steps is not intended to limit this disclosure. In the method 300, two or more calibration images may be utilized for the comparison to a current captured image. In some implementations, two or more calibration images are captured under different lighting conditions, and the reference feature from each image is stored for future comparisons in a wing position check. A captured image may then be compared with a calibration image having similar lighting conditions. In some examples, comparison to a calibration image having similar lighting conditions may result in improved accuracy of a wing position check. In some examples, after usage, performance and/or accuracy can continue and/or improve under different lighting conditions.

The calibration module 50 is used to calibrate a wing position and its supported camera relative to the vehicle in order to provide the desired field of view (block 302). The calibration module 50 extracts and stores a reference feature from a calibrated image from the image capture unit of the camera 20 (block 304A). The calibration module 50 extracts and stores a reference feature from a second calibrated image from the image capture unit of the camera 20 (block 304B). In some implementations, before storing the second calibrated image for reference, the second calibrated image may be compared to the first calibrated image, such as in the same manner of comparisons disclosed herein. If the position of one or more reference features in the second calibrated image is sufficiently similar to the position of the one or more reference features in the first calibrated image, the second calibrated image may then be stored for reference. In some implementations, the second image at block 304B is captured under a different lighting condition from the first calibrated image. Although two calibrated images are captured in the example, additional calibration images may be captured and stored in some implementations, including additional images under various lighting conditions.

Figure 7:
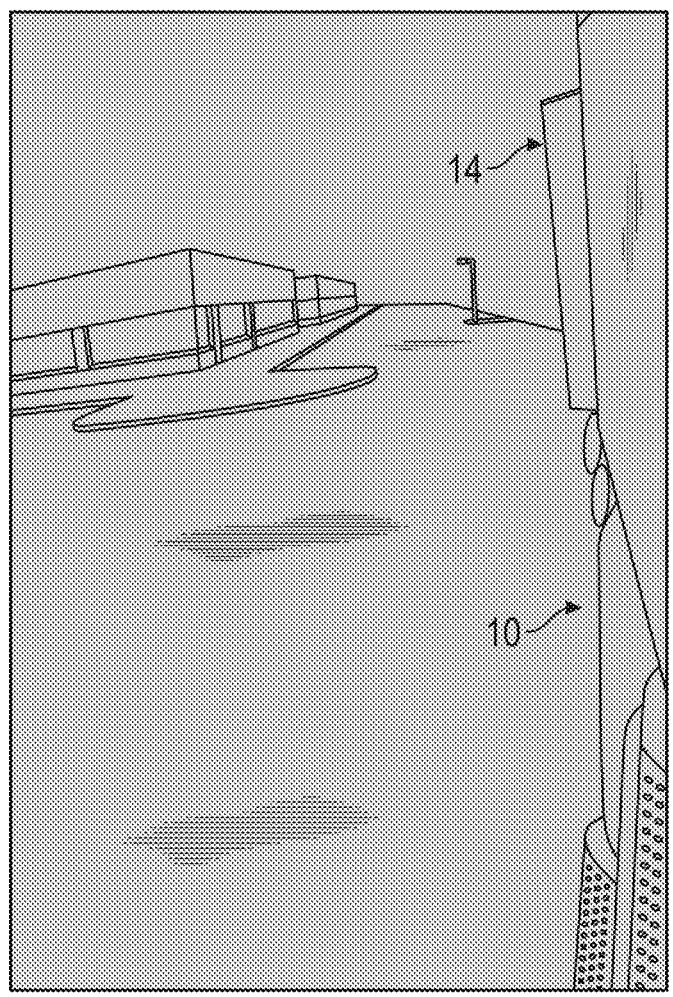
FIG. 7 illustrates a second calibrated image.

An example second calibrated image is shown in FIG. 7, and may be substantially similar to the calibrated image shown in FIG. 3A, except that the second calibrated image was captured under a darker lighting condition than the original calibrated image. In some implementations, an original calibrated image is captured and stored during assembly in a bright plant environment, and a second calibrated image is captured and stored during a darker road environment. In some implementations, an original calibrated image is captured and stored during a darker environment than the second calibrated image. In some implementations, three or more calibrated images are captured, each at different lighting environments. In some examples, later captured calibrated images may be compared to one or more earlier calibrated images and stored if similarity to one or more earlier calibrated images, such as similarity with regard to one or more reference features, is above a certain threshold. In some examples, a second calibrated image may be compared to the original calibrated image and stored if similarity to the original calibrated image, such as similarity with regard to one or more reference features, is above a certain threshold.

The wing position verification module 52 is utilized in response to an event in which a wing position check is desired (block 306). Once a wing position verification has been triggered, a current image (FIG. 3B) is captured by the camera 20, and image processing algorithm 46 attempts to extracts the current position of the same feature(s) previously captured and stored during calibration (block 308). In some implementations, the lighting sensor 47 senses the lighting condition at the time the current image is captured. The wing position verification module 52 may then determine which of the two or more stored images has the most similar lighting condition to the current image and selects the stored image with the most similar lighting condition for comparison (block 309).

The current position of the reference feature is compared to the stored reference feature of the selected stored image to see if the camera 20 has been undesirably moved from its initially calibrated position (block 310), which may result in the camera 20 being unable to provide the legally described view. This comparison may be performed by comparing a distance between at least a portion of the stored reference feature from the current position of the reference feature in 2-dimensional space. The distance may correspond to the distance between pixels in the captured images from the image capture unit of the calibrated image and the current image.

There may be some tolerance with respect to the camera wing being out of position and the legally described view still being provided. Accordingly, the output result is based upon a comparison relative to a threshold value (block 312; e.g., reference feature and current position of same feature being within a predetermined number of pixels). The output may be a visible warning on the display 18, for example, or an audible warning. In some implementations, if the captured image has at least a threshold similarity to one or more of the calibrated images, the captured image may be stored as an additional and/or replacement calibrated image. In those implementations, the wing position verification module 52 can smartly update its ground truth feature after long-term use.

Although different lighting conditions were disclosed as an example to capture and store multiple calibrated images, there may be other reasons in other examples. In some examples, the portion of the vehicle shown in the calibrated image may have chipped paint or other damage that may cause false warnings that the camera is out of position. In other examples, the portion of the vehicle shown in the calibrated image may have undergone a new paint job. In these examples, a new captured image may be stored as an additional calibrated image or may be stored as a replacement to a prior calibrated image.

A method of checking wing position in a camera monitor system may be said to include performing a calibration of a wing position supporting a camera relative to a vehicle to provide a desired field of view by capturing multiple images with at different lighting conditions, extracting and storing a reference feature from each of the multiple images, triggering a wing position check, capturing a current image from the camera, the current image having a current position of the reference feature; sensing a current lighting condition at which the current image is captured, determining that one of the different lighting conditions is more similar to the current lighting condition, comparing the current position of the reference feature to the stored reference feature from the one of the multiple images generated under the one of the different lighting conditions, and outputting a result of the wing position check if a difference from the comparing step exceeds a threshold value.

A camera monitor system (CMS) for a vehicle may be said to include a wing pivotably mounted to the vehicle, a camera mounted to the wing and having an image capture unit configured to provide a desired field of view of the vehicle, a display configured to depict at least a portion of the field of view, an input configured to trigger a wing position check, and a controller in communication with the camera and the display. The controller may include a calibration module in which a reference feature is extracted from each of multiple images captured under different lighting conditions in which the desired field of view is provided, and the controller may have a memory in which the reference feature is stored. The controller may include a wing position verification module responsive to the input configured to capture a current image from the camera having a current position of the reference feature under a current lighting condition. One or more sensors in communication with the controller may be configured to sense the different lighting conditions and the current lighting condition. The wing position verification module is configured to determine that one of the different lighting conditions is more similar to the current lighting condition, compare the current position reference feature to the stored reference feature from the one of the multiple images associated with the one of the different lighting conditions, and output a result of the wing position check if a difference from comparing step exceeds a threshold value.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A method of checking wing position in a camera monitor system, comprising:
    performing a calibration of a wing position supporting a camera relative to a vehicle to provide a desired field of view by capturing multiple images at different lighting conditions;
    extracting and storing a reference feature from each of the multiple images;
    triggering a wing position check;
    capturing a current image from the camera, the current image having a current position of the reference feature;
    sensing a current lighting condition at which the current image is captured;
    determining that one of the different lighting conditions is most similar to the current lighting condition;
    comparing the current position of the reference feature to the stored reference feature from the one of the multiple images generated under the one of the different lighting conditions, including comparing a distance between at least a portion of the stored reference feature of the one of the multiple images generated under the one of the different lighting conditions from the current position of the reference feature in 2D space; and
    outputting a result of the wing position check if a difference from the comparing step exceeds a threshold value.

2. The method of claim 1, wherein the performing a calibration comprises:
    performing a first calibration, including calibrating a wing position supporting a camera relative to a vehicle to provide a desired field of view, wherein the calibrating includes generating a first calibrated image from the camera under a first lighting condition; and
    performing a second calibration, including generating a second calibrated image from the camera under a second lighting condition different from the first lighting condition;
    the extracting a storing a reference feature comprises:
    extracting and storing a reference feature from the first calibrated image; and
    extracting and storing the reference feature from the second calibrated image;
    the determining step comprises:
    determining that one of the first lighting condition and the second lighting condition is more similar to the current lighting condition; and
    the comparing step comprises:
    comparing the current position of the reference feature to the stored reference feature from the one of the first calibrated image and the second calibrated image generated under the one of the first lighting condition and the second lighting condition.

3. The method of claim 1, wherein the calibration is performed upon installation of the wing onto the vehicle.

4. The method of claim 3, wherein the calibration is performed with the wing in an unfolded position and the camera trained upon a legally prescribed field of view.

5. The method of claim 1, wherein the reference feature includes a vertical edge of a tractor of the vehicle.

6. The method of claim 1, comprising storing the captured image as a third calibrated image check if a difference from the comparing step exceeds a second threshold value.

7. The method of claim 1, wherein the triggering step is performed based upon a time interval.

8. The method of claim 1, wherein the distance is a distance between pixels in captured images of from the one of the multiple images and the current image.

9. The method of claim 1, wherein the result is at least one of a visible warning and an audible warning.

10. A method for verifying a position of a camera-supporting wing mounted to a vehicle in a camera monitor system, the method comprising:
 calibrating the wing position relative to the vehicle to establish a desired field of view, the calibration comprising:
  capturing a first calibrated image of the field of view under a first ambient lighting condition;
  capturing a second calibrated image of the field of view under a second ambient lighting condition different from the first ambient lighting condition;
  extracting and storing a reference feature from each of the first and second calibrated images;
 initiating a wing position check;
 capturing a current image from the camera, the current image including a current position of the reference feature;
 sensing a current ambient lighting condition at the time the current image is captured;
 determining which of the first or second ambient lighting conditions is most similar to the current ambient lighting condition;
 comparing the current position of the reference feature to the stored reference feature corresponding to the calibrated image captured under the determined most similar ambient lighting condition, wherein the comparing includes calculating a distance between at least a portion of the stored reference feature from the calibrated image captured under the determined most similar ambient lighting condition and the current position of the reference feature in two-dimensional image space; and
 outputting a result of the wing position check if a difference between the compared positions exceeds a predefined threshold value.

11. The method of claim 10, wherein the distance is determined as a pixel-wise difference between the current image and the calibrated image captured under the determined most similar ambient lighting condition.

12. The method of claim 10, wherein the reference feature includes a vertical edge of a tractor of the vehicle.

13. The method of claim 10, comprising:
 sensing the first ambient lighting condition at the time the first calibrated image is captured; and
 sensing the second ambient lighting condition at the time the second calibrated image is captured.

14. A method for verifying a position of a camera-supporting wing mounted to a vehicle in a camera monitor system, the method comprising:
 calibrating the wing position relative to the vehicle to establish a desired field of view, the calibration comprising:
  capturing multiple calibrated images of the field of view under different ambient lighting conditions; and
  extracting and storing a reference feature from each of the calibrated images;
 initiating a wing position check;
 capturing a current image from the camera, the current image including a current position of the reference feature;
 sensing a current ambient lighting condition at the time the current image is captured;
 determining which of the stored ambient lighting conditions is most similar to the current ambient lighting condition;
 comparing the current position of the reference feature to the stored reference feature corresponding to the calibrated image captured under the determined most similar ambient lighting condition, wherein the comparing includes calculating a distance in two-dimensional image space between at least a portion of the stored reference feature and the current position of the reference feature; and
 outputting a result of the wing position check if the calculated distance exceeds a predefined threshold value.

15. The method of claim 1, comprising,
 performing the calibration while the camera is positioned to provide a legally prescribed field of view; and
 determining whether the camera is able to provide the legally prescribed field of view based on the comparing step.

16. The method of claim 15, comprising:
 actuating the wing to return it to a position showing the legally prescribed field of view.

17. The method of claim 16, wherein the reference feature includes a vertical edge of a tractor of the vehicle.

18. The method of claim 14, wherein the reference feature includes a vertical edge of a tractor of the vehicle.

* * * * *